United States Patent
Oishi

(10) Patent No.: US 9,299,228 B2
(45) Date of Patent: Mar. 29, 2016

(54) SALES DATA PROCESSING APPARATUS, SALES DATA PROCESSING SYSTEM, AND COMPUTER-READABLE STORAGE MEDIUM

(75) Inventor: Kazuhiro Oishi, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 795 days.

(21) Appl. No.: 13/533,122

(22) Filed: Jun. 26, 2012

(65) Prior Publication Data

US 2013/0002878 A1    Jan. 3, 2013

(30) Foreign Application Priority Data

Jun. 28, 2011    (JP) ................................. 2011-142661

(51) Int. Cl.
*H04N 7/18*        (2006.01)
*G07F 19/00*       (2006.01)
(Continued)

(52) U.S. Cl.
CPC ............ *G07F 19/207* (2013.01); *G06Q 20/209* (2013.01); *G07G 1/0054* (2013.01); *G07G 3/003* (2013.01); *G08B 13/19613* (2013.01)

(58) Field of Classification Search
CPC ..... G07F 19/207; G07F 19/00; G07G 1/0054; G07G 3/003; G07G 1/14; G06K 15/00; H04N 7/18; G06Q 20/209; G08B 13/19613
USPC ........................................... 348/150; 725/34
See application file for complete search history.

(56) References Cited

U.S. PATENT DOCUMENTS

| | | | |
|---|---|---|---|
| 8,762,236 B1* | 6/2014 | Shirey et al. ..................... | 705/35 |
| 2003/0098910 A1* | 5/2003 | Kim .............................. | 348/150 |

(Continued)

FOREIGN PATENT DOCUMENTS

| | | |
|---|---|---|
| CN | 102044116 A | 5/2011 |
| JP | 2003331365 A | 11/2003 |

(Continued)

OTHER PUBLICATIONS

Japanese Office Action dated Jul. 22, 2014 issued in counterpart Japanese Application No. 2013-143160.

(Continued)

*Primary Examiner* — Allen Wong
(74) *Attorney, Agent, or Firm* — Holtz, Holtz & Volek PC

(57) ABSTRACT

A sales data processing apparatus which registers and processes sales data on a transaction-by-transaction basis. The apparatus includes: an imaging module that images manipulation situations successively; a recording module that successively records manipulation images taken by the imaging module; a journal storage module that successively stores and manages manipulation data of respective manipulations as journal data; a reproducing module that performs a reproduction operation of successively reading and displaying the manipulation images recorded by the recording module; a detecting module that detects timing of occurrence of a prescribed caution-needed manipulation by successively referring to contents of the journal storage module in link with the reproduction operation of the reproducing module; and a display control module that displays prescribed alerting data in association with a manipulation image at the timing of occurrence, detected by the detecting module, of the prescribed caution-needed manipulation.

17 Claims, 11 Drawing Sheets

(51) Int. Cl.
  *G07G 1/00* (2006.01)
  *G07G 3/00* (2006.01)
  *G06Q 20/20* (2012.01)
  *G08B 13/196* (2006.01)

(56) References Cited

U.S. PATENT DOCUMENTS

| | | | |
|---|---|---|---|
| 2005/0269405 A1* | 12/2005 | Throckmorton et al. | 235/383 |
| 2006/0200842 A1* | 9/2006 | Chapman et al. | 725/34 |
| 2006/0243798 A1* | 11/2006 | Kundu et al. | 235/383 |
| 2008/0303902 A1 | 12/2008 | Romer et al. | |
| 2010/0117831 A1* | 5/2010 | Katabira | 340/568.3 |
| 2011/0087535 A1 | 4/2011 | Yoshizawa et al. | |
| 2012/0030003 A1* | 2/2012 | Herwig | 705/14.38 |

FOREIGN PATENT DOCUMENTS

| | | |
|---|---|---|
| JP | 2005-115504 A | 4/2005 |
| JP | 2009-230682 A | 10/2009 |
| JP | 2010533319 A | 10/2010 |
| JP | 2011-086087 A | 4/2011 |

OTHER PUBLICATIONS

Chinese Office Action dated May 16, 2014 in counterpart Chinese Application No. 201210218559.2.

Japanese Office Action dated Apr. 10, 2013 (and English translation thereof) in counterpart Japanese Application No. 2011-142661.

* cited by examiner

MONITORING IMAGE TAKEN BY IMAGING OPERATOR AND MANIPULATION SITUATION

SALES DATA PROCESSING APPARATUS, SALES DATA PROCESSING SYSTEM, AND COMPUTER-READABLE STORAGE MEDIUM

CROSS REFERENCE TO RELATED APPLICATION(S)

The present disclosure relates to the subject matters contained in Japanese Patent Application No. 2011-142661 filed on Jun. 28, 2011, which are incorporated herein by reference in its entirety.

FIELD

One or more embodiments of the present invention relate to a sales data processing apparatus, a sales data processing system, and a computer-readable storage medium for registering and processing sales data on a transaction-by-transaction basis.

BACKGROUND

In general, in supermarkets, convenience stores, and other stores, sales data (item names, numbers, and prices), changes, etc. that have been registered and processed by a sales data processing apparatus such as an electronic cash register (ECR) or a point of sale (POS) terminal are recorded as journal data on a transaction-by-transaction basis. Other things such as manipulation situations are also recorded as journal data. When whole day business has finished, a person in charge checks, in detail, for a manipulation mistake, an unjust manipulation, etc. made by an operator by examining various manipulation situations involving the operator by referring to the journal data. A technique for preventing injustices is disclosed in which when a manipulation for opening the drawer is performed, a face of an operator is imaged and a control is made so as to prohibit opening of the drawer unless resulting image data and related journal data are transferred to and recorded in a face image database of an external apparatus (refer to JP-A-2009-230682).

In the above technique of JP-A-2009-230682, taking and recording of a face image of an operator are made conditions that are indispensable for opening of the drawer, whereby the face image is left as evidence. However, when a person in charge checks for injustices based on a shot image, he or she may not be able to recognize who opened the drawer, how the drawer was opening, or whether or not an unjust manipulation other than drawer opening was performed. As such, this technique is insufficient as a tool for checking for an unjust manipulation.

SUMMARY

An object of the embodiments of the present invention is to make it possible to check for an unjust manipulation by reproducing manipulation images taken by imaging manipulation situations, in such a manner that attention is paid to caution-needed manipulations, that is, manipulations that might relate to injustices.

According to a first aspect of the embodiments, there is provided a sales data processing apparatus which registers and processes sales data on a transaction-by-transaction basis, the apparatus including: an imaging module configured to image manipulation situations successively; a recording module configured to successively record manipulation images taken by the imaging module; a journal storage module configured to successively store and manage manipulation data of respective manipulations as journal data; a reproducing module configured to perform a reproduction operation of successively reading and displaying the manipulation images recorded by the recording module; a detecting module configured to detect timing of occurrence of a prescribed caution-needed manipulation by successively referring to contents of the journal storage module in link with the reproduction operation of the reproducing module; and a display control module configured to display prescribed alerting data in association with a manipulation image at the timing of occurrence, detected by the detecting module, of the prescribed caution-needed manipulation.

According to a second aspect of the embodiments, there is provided a sales data processing system including: a sales data processing apparatus which registers and processes sales data on a transaction-by-transaction basis; and a managing apparatus which manages the sales data, wherein: the sales data processing apparatus includes: an imaging module configured to image manipulation situations successively; a recording module configured to successively record manipulation images taken by the imaging module; and a journal storage module configured to successively store manipulation data of respective manipulations as journal data; and the managing apparatus includes: a reproducing module configured to perform a reproduction operation of successively reading and displaying the manipulation images recorded by the recording module; a detecting module configured to detect timing of occurrence of a prescribed caution-needed manipulation by successively referring to the contents of the journal storage module in link with the reproduction operation of the reproducing module; and a display control module configured to display prescribed alerting data in association with a manipulation image at the timing of occurrence, detected by the detecting module, of the prescribed caution-needed manipulation.

According to a third aspect of the embodiments, there is provided a computer-readable storage medium that stores a program for causing a computer to execute procedures including: registering and processing sales data on a transaction-by-transaction basis; imaging manipulation situations successively; successively recording taken manipulation images; successively storing and managing manipulation data of respective manipulations as journal data; performing a reproduction operation of successively reading and displaying the recorded manipulation images; detecting timing of occurrence of a prescribed caution-needed manipulation by successively referring to the contents of the journal data in link with the reproduction operation; and displaying prescribed alerting data in association with a manipulation image at the timing of occurrence, detected by the detecting module, of the prescribed caution-needed manipulation.

The embodiments of the present invention make it possible to check for an unjust manipulation by reproducing manipulation images taken by imaging manipulation situations, in such a manner that attention is paid to manipulations that require attention, that is, manipulations that might relate to injustices. The check can thereby be made efficient and reliable. Furthermore, the load of a person who performs checks can be reduced.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

FIG. 7 is a flowchart which outlines the entire process of the ECR which is started upon power-on.

DETAILED DESCRIPTION OF THE EMBODIMENTS

First Embodiment

First, a first embodiment of the present invention will be described with reference to FIGS. 1 to 9.

Figure 1:
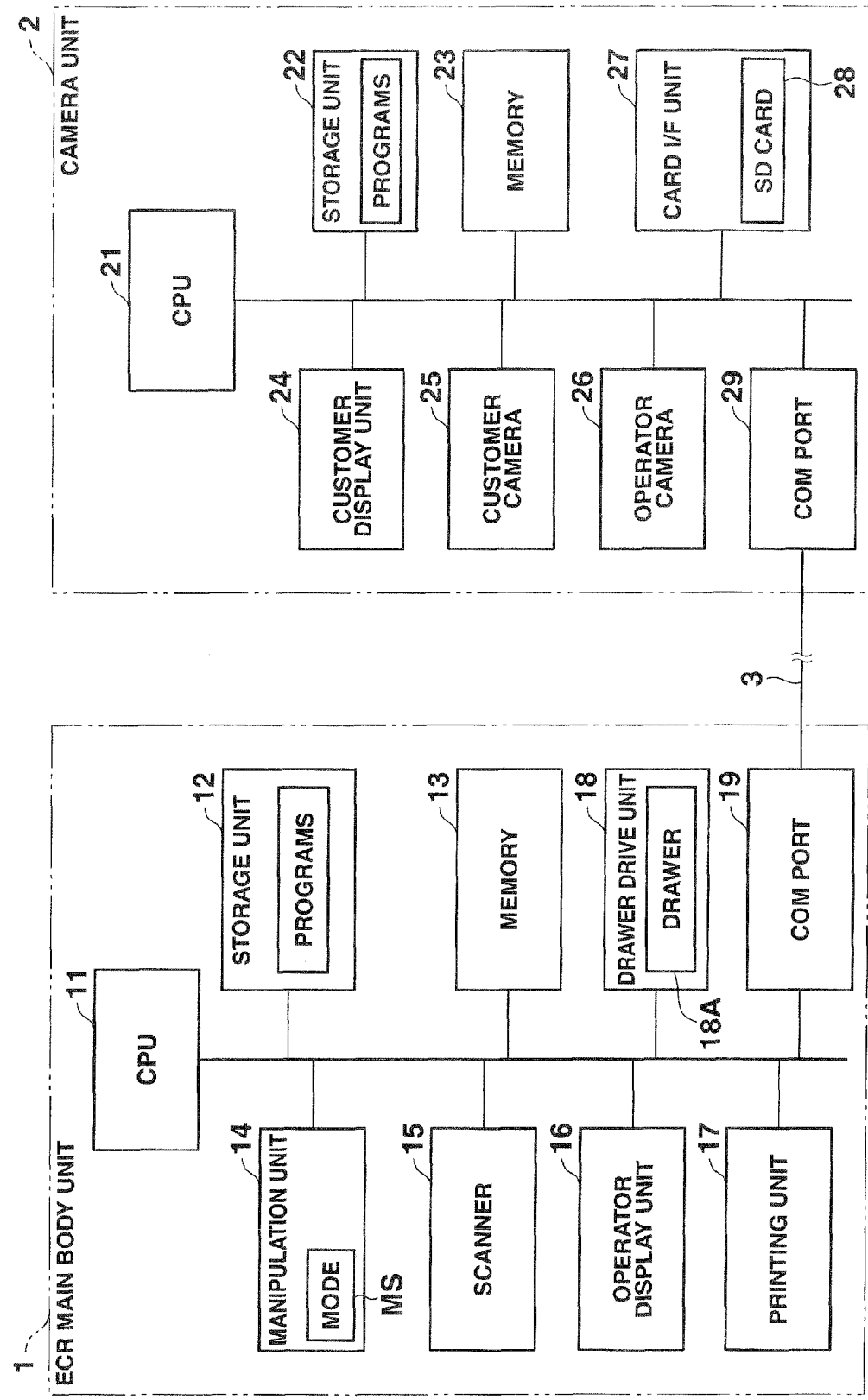
FIG. 1 is a block diagram showing basic constituent blocks of an ECR according to a first embodiment.

FIG. 1 is a block diagram showing basic constituent blocks of an electronic cash register (ECR) as an example sales data processing apparatus.

This ECR is separated into an ECR main body unit 1 and a camera unit 2. The camera unit 2 is attached to the ECR main body unit 1 detachably and connected to the latter by a cable 3. The ECR main body unit 1 is provided with basic (standard) ECR functions, an example of which is a sales data registration function of registration-processing input sale data of one transaction and performing accounting processing according to bills and coins that are handed over from a customer after the registration processing of the one transaction. In the embodiment, the ECR main body unit 1 is also provided with a function of generating event codes corresponding to various key manipulations, drawer opening and closure, etc. and transferring the generated event codes to the camera unit 2 as journal data.

The camera unit 2 is provided with various functions such as a camera function of imaging a customer who is waiting for registration (checkout) and an operator and his or her manipulation situations and a manipulation check function of checking for an unjust manipulation by reproducing images taken by the camera function. These functions are implemented as modules. Attached to the ECR main body unit 1 detachably and connected to the latter by the cable 3, the camera unit 2 can be replaced by a new one anytime freely when, for example, it has failed. When necessary, the ECR main body unit 1 and the camera unit 2 cooperate to perform any of various kinds of processing.

The ECR main body unit 1 is centered by a central processing unit (CPU) 11 which controls the entire operation of the ECR main body unit 1 according to various programs. A storage unit 12 is equipped with storage media such as a ROM, a RAM, and a flash memory and drive systems therefor, and stores programs for causing the ECR to operate according to processes to be described later with reference to FIGS. 7 and 8, various applications, etc. and also stores a database, character font data, etc. The above-mentioned storage media are not limited to fixed built-in storage media and may be detachable and portable external storage media. And the above-mentioned programs and data may be installed in the storage media from another apparatus via a wired or wireless transmission line or used by accessing a server which stores and manages the programs and data. A memory 13 is a work area for temporarily storing various data such as time data and flags that are necessary for operation of the ECR main body unit 1.

Input/output peripheral devices of the CPU 11 which are a manipulation unit 14, a scanner 15, an operator display unit 16, a printing unit 17, a drawer drive unit 18, and a COM port 19 are connected to the CPU 11 by a bus line. The CPU 11 controls their operations according to input/output programs. The manipulation unit 14 has a mode switch MS and a keyboard on which various push-button keys are arranged. In addition to a ten-key unit (not shown) etc., registration keys, a subtotal key, a cash/deposit key, and other keys are arranged on the keyboard.

The mode switch MS is a rotary switch for switching between various operation modes (program kinds) such as a registration (REG) mode, a return (RF) mode, and a final accounting (Z) mode according to its switching position. The registration keys are an item key for commanding item-by-item registration such as a price look up (PLU) key, a category key, etc. In the registration (REG) mode, the CPU 11 generates an event code according to each of various kinds of key manipulations and performs registration processing of displaying input sales data and updating the sum of sales values. When the cash/deposit key is pushed after completion of registration of one transaction, the CPU 11 causes opening of a drawer 18A and issuance of a receipt.

The image scanner 15 has an image sensor such as a CCD or a CMOS sensor and serves to read a bar code or a two-dimensional code attached to an item by imaging it when the item is scanned at the time of registration. The CPU 11 decodes a bar code or the like by analyzing image data obtained by the image scanner 15 and thereby identifies the item. The operator display unit 16 displays a price of an item, data or a message relating to the item, etc. to an operator, and is a liquid crystal display, an organic electroluminescence (EL) display, or the like. The printing unit 17, which is a non-impact printer of thermal transfer, ink jet, or a like type or a dot impact printer, performs receipt printing. The drawer drive unit 18 controls the opening/closure of the drawer 18A in response to a key manipulation. When the drawer 18A is opened or closed, the CPU 11 generates a drawer opening/closure event. The COM port 19 is a serial port for connection to the camera unit 2.

The camera unit 2 is centered by a central processing unit (CPU) 21 which controls the entire operation of the camera unit 2 according to various programs. A storage unit 22 is equipped with storage media such as a ROM, a RAM, and a flash memory and drive systems therefor, and stores programs for causing the ECR to operate according to a process to be described later with reference to FIG. 9, various applications, etc. A memory 23 is a work area for temporarily storing various data that are necessary for operation of the camera unit 2.

Input/output peripheral devices of the CPU 21 which are a customer display unit 24, a customer camera 25, an operator camera 26, a card interface unit 27, and a COM port 29 are connected to the CPU 21 by a bus line. The CPU 21 controls their operations according to input/output programs. The customer display unit 24 is provided for a customer who is waiting for registration (checkout) and its screen faces the customer. Being a 7-segment LED (light-emitting diode) display, for example, the customer display unit 24 displays numerical values representing a unit price of an item, a number, a subtotal amount, a deposit amount, etc.

The customer camera 25 is disposed close to the customer display unit 24 and images mainly the face of a customer who is waiting for registration. The operator camera 26 is a monitoring camera for imaging an operator and his or her manipulation situations. Although neither of the customer camera 25 nor the operator camera 26 is illustrated in detail, each of them has a lens unit, an imaging device, an analog-to-digital (A/D) conversion section, etc. and can take a moving image. Each of the customer camera 25 and the operator camera 26 can take a high-resolution image of a subject by forming a subject image on the imaging device such as a CCD or a CMOS sensor by the lens unit.

An SD card 28 as a recording medium is inserted into the card interface unit 27. The SD card 28 is stored with various files (described later). The camera unit 2 is provided with a lock (not shown) for preventing theft or the like of the SD card 28 inserted in the card interface unit 27. To take out the SD card 28, it is necessary for a person in charge to open the lock using a dedicated key he or she keeps. The external storage medium is not limited to the SD card and may be of another type. The COM port 29 is a serial port for connection to the ECR main body unit 1.

Figure 2:
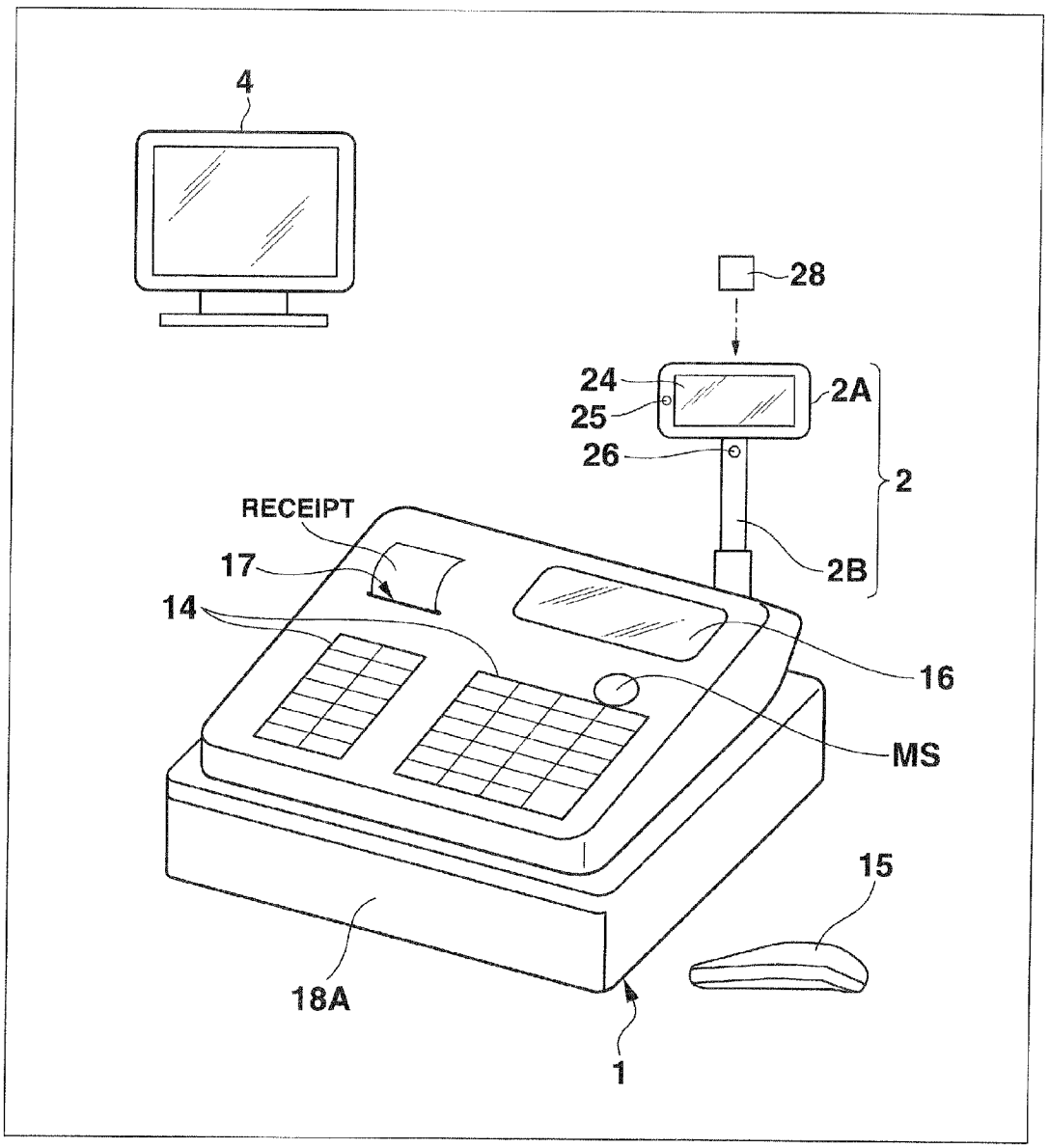
FIG. 2 is a perspective view showing an appearance of the ECR as viewed obliquely from the front side (from the customer side).
Figure 3:
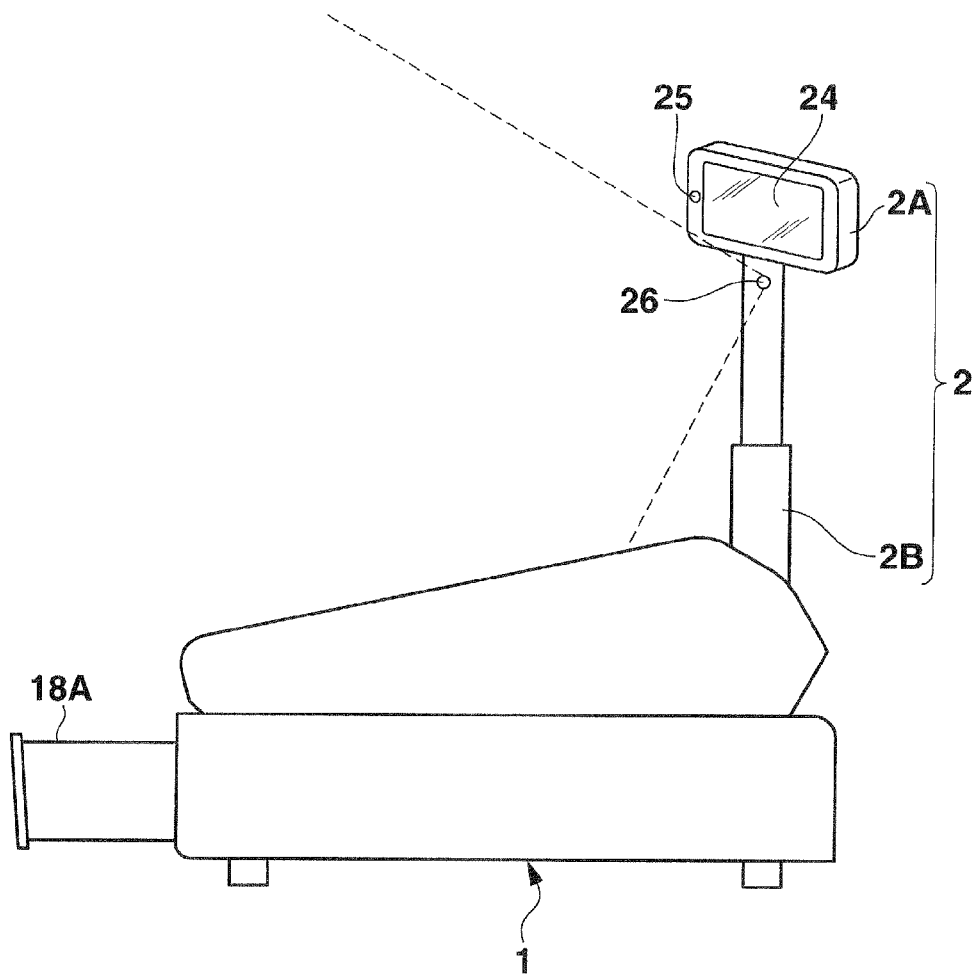
FIG. 3 is a side view showing a side appearance of the ECR.

FIG. 2 is a perspective view showing an appearance of the above-configured ECR as viewed obliquely from the front side (from the customer side). FIG. 3 is a side view showing a side appearance of the ECR.

The top surface of the ECR main body unit 1 is provided with the operator display unit 16 as well as the keyboard and the mode switch MS which constitute the manipulation unit 14. The top surface of the ECR main body unit 1 is also provided with a receipt issuance opening (not shown) through which to take out a receipt that is sent out from the printing unit 17.

The camera unit 2 has a cabinet 2A of the customer display unit 24 and a pole-shaped support member (support pole) 2B which supports the cabinet 2A. A bottom portion of the support pole 2B is fixed to the backside of the ECR main body unit 1 so that the support pole 2B is erected vertically. The cabinet 2A of the customer display unit 24 is attached to a top portion of the support pole 2B. The support pole 2B is configured so that its length is adjustable, and the cabinet 2A of the customer display unit 24 is rotatable with respect to the support pole 2B. That is, the height and the direction of the cabinet 2A are adjustable and the height and the direction of the customer display unit 24 and the customer camera 25 are adjustable accordingly.

As shown in FIGS. 2 and 3, the customer camera 25 is disposed on the front surface of the cabinet 2A close to one end (in FIGS. 2 and 3, the left end) of the customer display unit 24. The imaging direction of the customer camera 25 is toward a customer who is waiting for registration, and its angle of view is set in such a range that the customer camera 25 can image a customer who is waiting for registration.

Figure 4:
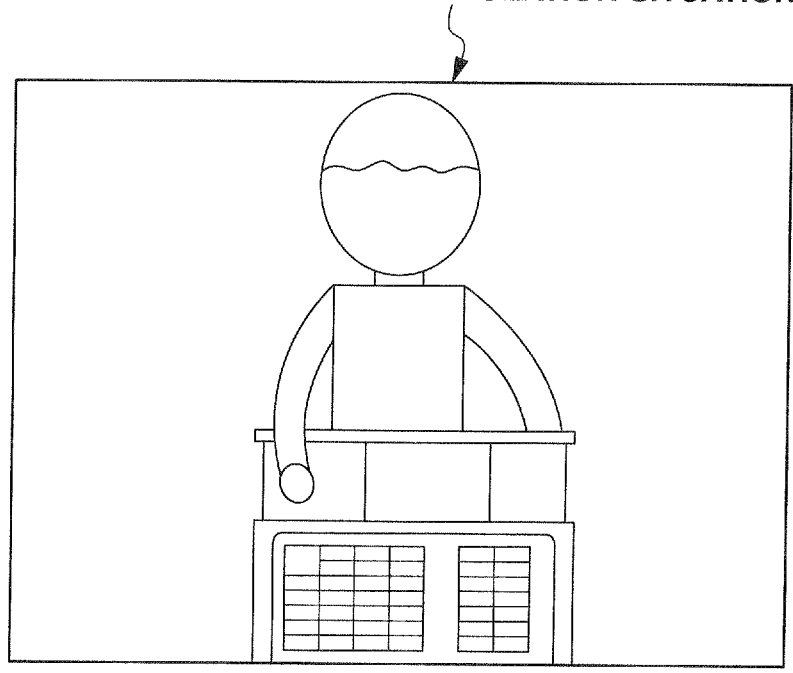
FIG. 4 shows an example manipulation image taken by an operator camera 26 by imaging an operator and his or her manipulation situation.

The operator camera 26 is disposed close to the top of the support pole 2B. The imaging direction of the operator camera 26 is toward an operator, and its angle of view is set in such a range that the operator camera 26 can image the entire manipulation unit 14 and the face of an operator who is manipulating the ECR. That is, the imaging direction and the angle of view of the operator camera 26 are set so that the operator camera 26 can image an operator and his or her manipulation situation. FIG. 4 shows an example manipulation image taken by the operator camera 26 which includes an operator and a manipulation situation that the operator is putting or taking coins into or out of the drawer 18A which is opened).

In the above-mentioned manipulation check function, a manipulation image (moving image) taken by the operator camera is reproduced using the operator display unit 16. Alternatively, a manipulation image (moving image) may be displayed on an external monitor (external display device) 4 shown in FIG. 2 by connecting it to the ECR by a cable.

Figure 5:
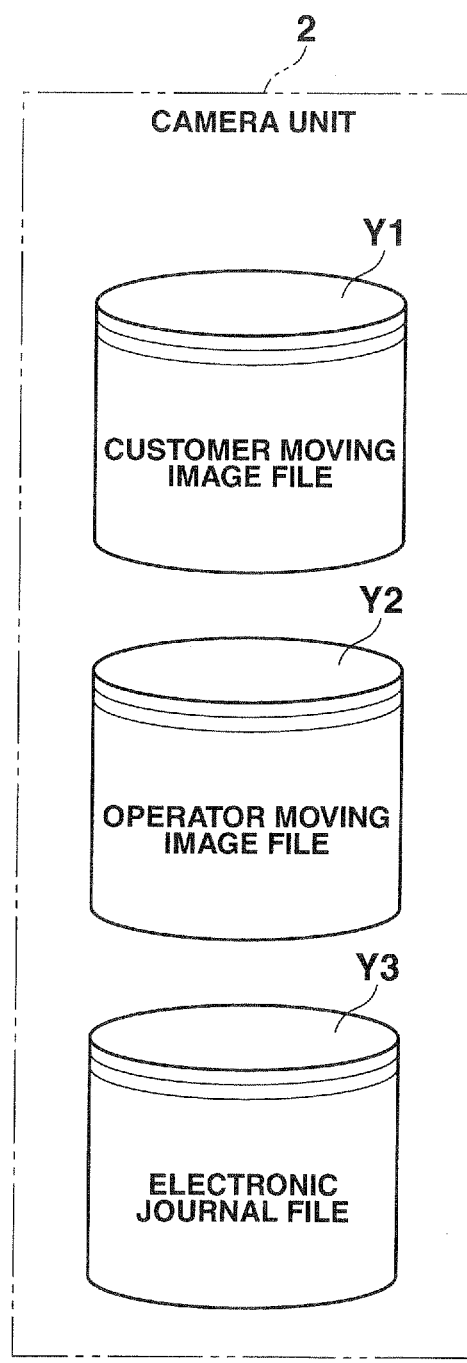
FIG. 5 shows various files provided in a camera unit 2.

FIG. 5 shows various files that are stored in and managed by the camera unit 2 (SD card 28).

A customer moving image file Y1, an operator moving image file Y2, an electronic journal file Y3, etc. are stored in and managed by the camera unit 2 (SD card 28). The customer moving image file Y1 contains files of moving images taken by the customer camera 25. Recording dates and times (time stamps) are stored successively together with a file name or the like of a moving image file so as to be correlated with the moving image file. The operator moving image file Y2 contains files of moving images taken by the operator camera 26. Time stamps (recording dates and times of respective scenes of a moving image) are stored successively together with a file name or the like of the moving image file so as to be correlated with the moving image file.

The electronic journal file Y3 is a file for successively storing and managing manipulation data for each manipulation as journal data, and is a file for storing and managing, as sales record data (journal data), printing data (manipulation data) which are successively printed on receipts for respective registration items, the printing data is data which include registered sales data and associated manipulations (e.g., kinds of manipulated keys (key codes, event codes)). To link (synchronize) the contents of the electronic journal file Y3 with the contents of the operator moving image file Y2, time stamps (recording dates and times of manipulation data) are also stored successively in the electronic journal file Y3. The above-mentioned time stamps (recording dates and times of respective scenes of a moving image and recording dates and times of manipulation data) are data for displaying the contents of the operator moving image file Y2 and the contents of the electronic journal file Y3 in a synchronized manner (i.e., enabling their simultaneous appearance). Instead of time stamps, chapter numbers (e.g., serial numbers) may be inserted (stored) in the operator moving image file Y2 and the electronic journal file Y3.

Figure 6:
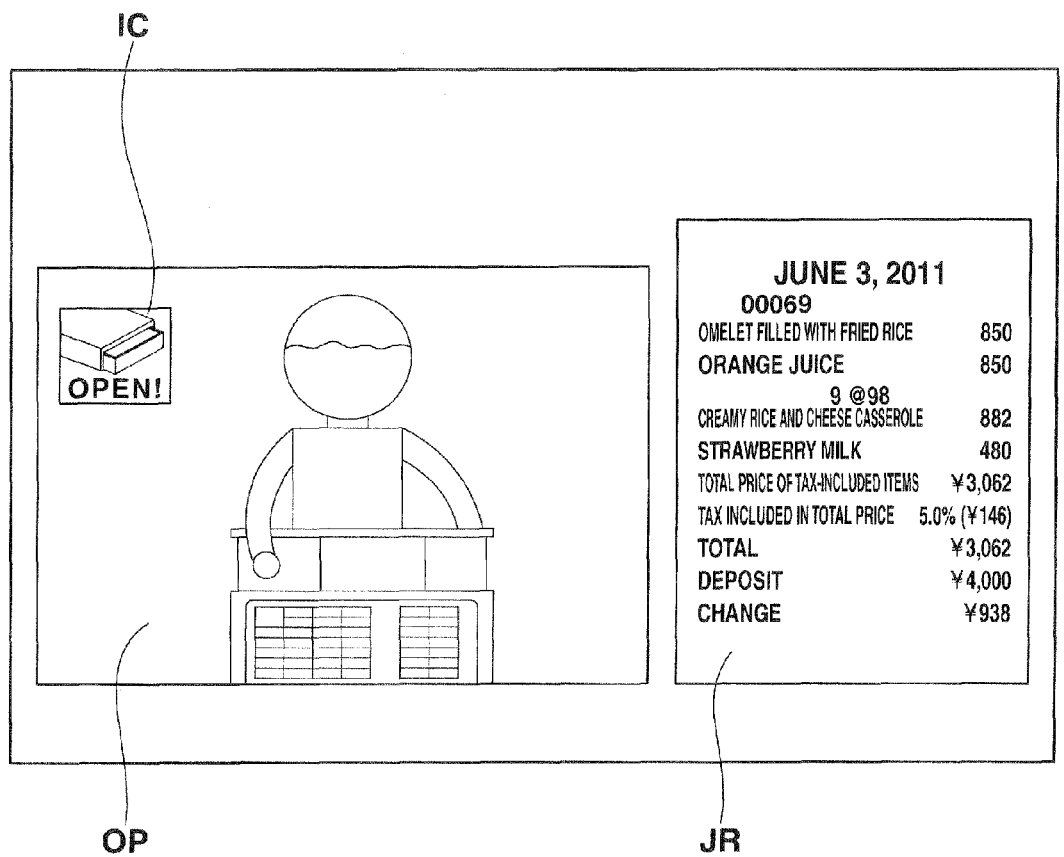
FIG. 6 shows an example display image on an operator display unit 16 or an external monitor 4 in a manipulation check function.

FIG. 6 shows an example display image on the operator display unit 16 or the external monitor 4 in the manipulation check function.

When the manipulation check function is performed, when necessary, the ECR main body unit 1 and the camera unit 2 cooperate to perform processing. When a person in charge, for example, commands activation of the manipulation check function, the camera unit 2 starts a reproduction operation of reading out a manipulation image (manipulation moving image) recorded in the operator moving image file Y2 and displaying it on the display screen. In link with (in synchronism with) the reproduction of the manipulation moving image, the camera unit 2 successively displays the contents of the electronic journal file Y3 on the same display screen. In FIG. 6, the left-hand image is a manipulation moving image reproduction image OP and the right-hand image is a journal data reproduction image JR. The manipulation moving image reproduction image OP and journal data reproduction image JR are reproduced and displayed so as to be synchronized with each other. That is, to display the manipulation moving image and the journal data that correspond to each other in a synchronized manner, the journal data are scrolled successively in link with the reproduction of the manipulation moving image.

In performing the manipulation check function, the camera unit 2 determines whether or not any of prescribed manipulations that require attention is included while referring to the contents of the electronic journal file Y3 successively. The prescribed manipulations that require attention are manipulations that might relate to injustices of an operator, and are a correction manipulation for commanding correction of input data, an accounting manipulation for commanding finishing of one transaction (a manipulation of the cash/deposit key for commanding opening of the drawer 18A (drawer opening manipulation)), a money receiving manipulation (drawer opening manipulation), and a return manipulation for commanding item return processing. The camera unit 2 detects manipulation timing (time stamp) of a caution-needed manipulation and displays prescribed alerting data in association with (e.g., in superimposition on) a reproduction moving image with the detected timing.

For example, if a manipulation that commands opening of the drawer 18A which is one of the prescribed manipulations that require attention is detected, the camera unit 2 superimposes prescribed alerting data (icon) on a manipulation moving image when a shot image of the drawer 18A being opened is reproduced. Different alerting data (icons) are used for the respective kinds of manipulations that require attention (correction manipulation, return manipulation, and drawer opening manipulation). Each alerting data should be such as to allow one to associate a kind of caution-needed manipulation). An alarm sound is generated from a speaker (not shown) simultaneously with the display of alerting data (icon). The alarm sound may be a one that was recorded at the time of an actual manipulation. That is, if an alarm sound was generated and recorded so as to be correlated with a manipulation moving image to be stored in the operator moving image file Y2 when a caution-needed manipulation was performed, the alarm sound can be reproduced when the manipulation moving image is reproduced.

Next, the operation concept of the ECR according to the first embodiment will be described with reference to flowcharts of FIGS. 7 to 9.

Each step of each flowchart is stored in the form of readable program code and these steps are executed successively according to the program code. Alternatively, these steps may be executed successively according to the program code that is transmitted over a transmission medium such as a network. That is, steps unique to the embodiment may be performed using programs and data that are supplied externally via a transmission medium instead of being stored in a recording medium.

Figure 7:
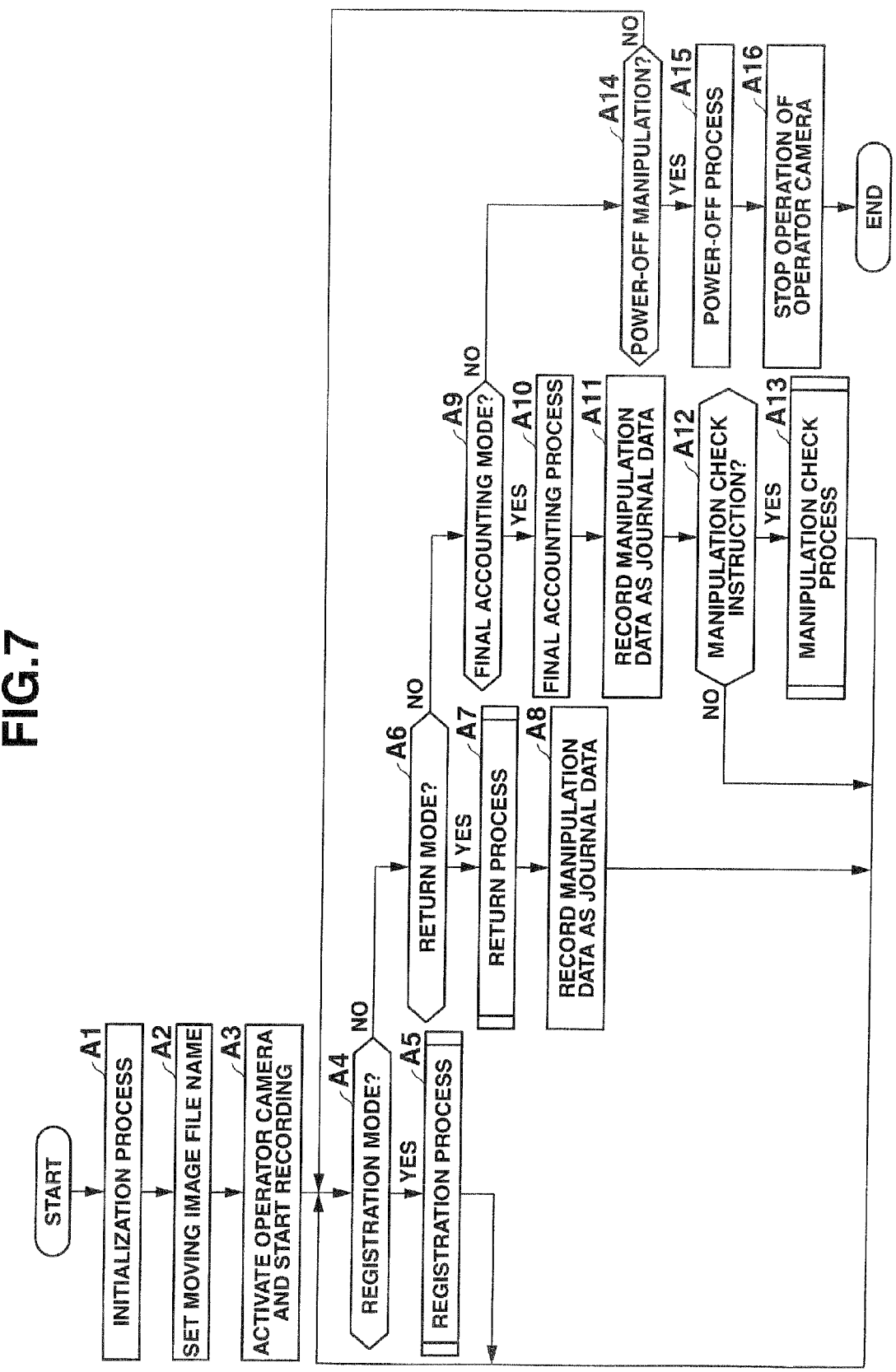

FIG. 7 is a flowchart which outlines the entire process the ECR which is started upon power-on.

First, the CPU 11 of the ECR main body unit 1 executes an initialization process (step A1) of clearing the various memories upon power-on. At step A2, the CPU 11 generates a moving image file name (e.g., data which is a date added with a serial number) and sets it in the operator moving image file Y2. At step A3, the CPU 11 activates the operator camera 26 and causes recording of a moving image taken by it. Then, the CPU 11 determines whether the mode switch MS is at the position of the registration (REG) mode (step A4), the return (RF) mode (step A6), or the final accounting (Z) mode (step A9), and whether or not a power-off manipulation has been made (step A14). If the mode switch MS is at the position of the registration mode (A4: yes), in response to a registration manipulation the process moves to a registration process (step A5) where sales data are registered.

Figure 8:
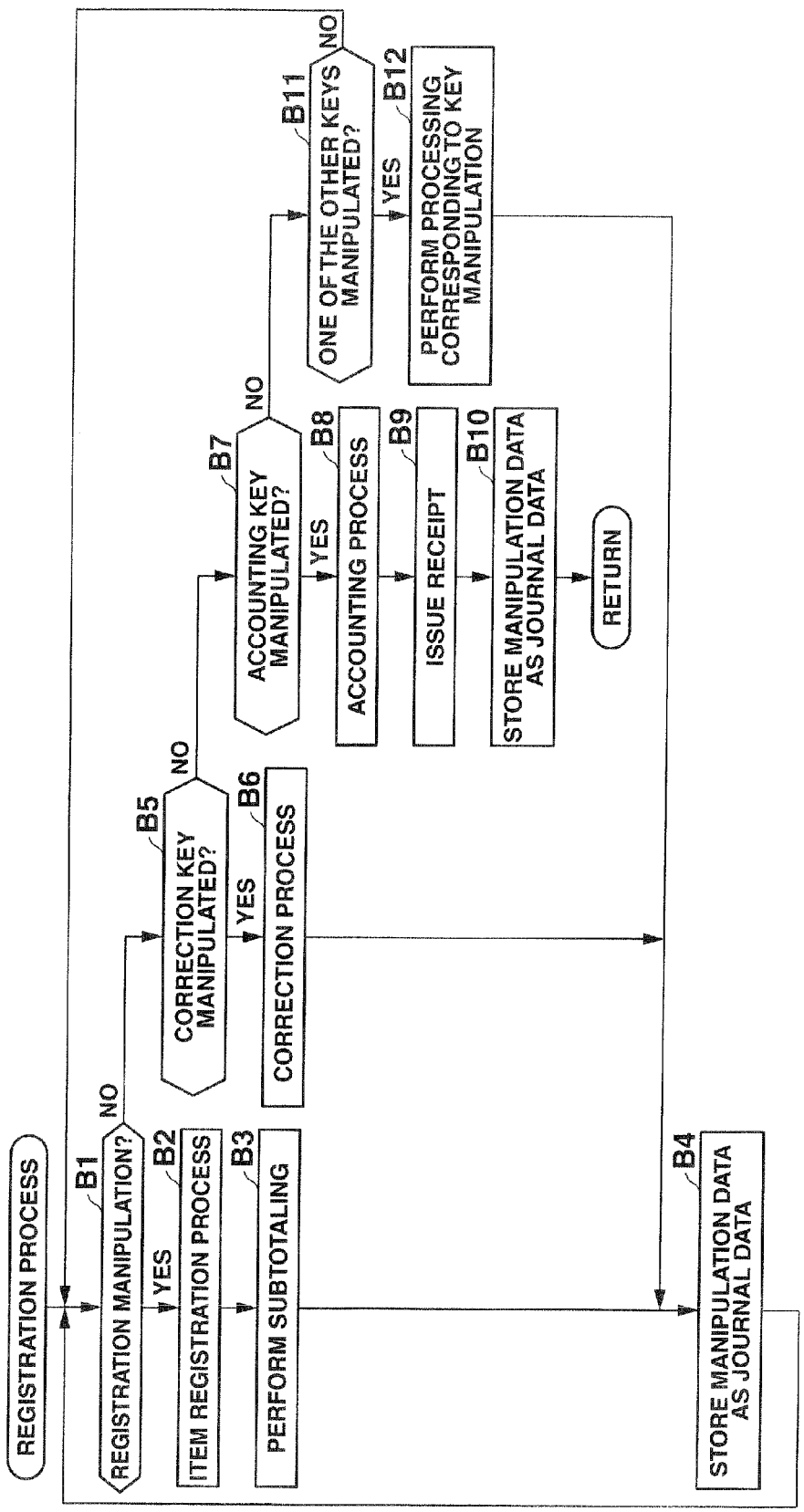
FIG. 8 is a flowchart for detailed description of a registration process (step A5 shown in FIG. 7).

FIG. 8 is a flowchart for detailed description of the registration process (step A5 shown in FIG. 7). The ECR main body unit 1 performs various kinds of processing by cooperating with the camera unit 2, when necessary.

The CPU 11 of the ECR main body unit 1 determines whether a registration manipulation has been performed, that is, scanning has been performed with the scanner 15 to read a bar code or the like from an item or one of the registration keys (e.g., item key) has been manipulated after input of a price (step B1 shown in FIG. 8), whether or not the correction key has been manipulated (step B5), whether or not one of the accounting keys (e.g., cash/deposit key) has been manipulated after registration of one transaction (step B7), and whether or not one of the other keys has been manipulated (step B11).

If a registration manipulation has been performed (B1: yes), the process moves to an item registration process (step B2), where the CPU 11 displays an input item name and unit price on the operator display unit 16 and the customer display unit 24 and performs processing of updating the contents (sales data) of an item-by-item sum file (not shown) and a category-by-category sum file (not shown) on the basis of the input sales data. The CPU 11 displays an item name and a unit price on the customer display unit 24 by transferring display data from the ECR main body unit 1 to the camera unit 2. After updating the subtotal of the one transaction concerned at step B3, at step B4 the CPU 11 stores and manipulation data that is associated with this registration in the electronic journal file Y3 as journal data. Then, the process returns to step B1. The above steps are executed again every time a registration manipulation is made.

If the correction key for correcting input data is manipulated (B5: yes), the CPU 11 executes a correction process (step B6) to correct the preceding input data. At step B4, the CPU 11 stores corrections data in the electronic journal file Y3 as journal data. Then, the process returns to step B1.

If one of the other keys (e.g., subtotal key) is manipulated (B11: yes), at step B12 the CPU 11 performs processing corresponding to the manipulation (e.g., processing of displaying a subtotal amount on the operator display unit 16 and the customer display unit 24). At step B4, CPU 11 stores data corresponding to the manipulation in the electronic journal file Y3 as journal data. Then, the process returns to step B1.

If one of the accounting keys (e.g., cash/deposit key) is manipulated after the end of registration of the one transaction concerned (B7: yes), the CPU 11 performs an accounting process (step B8) of updating transaction-type-by-transaction-type sums according to bills and coins that have been handed over from the customer and opening the drawer 18A if the manipulated accounting key is the cash/deposit key. At step B9, the CPU 11 activates the printing unit 17 and causes it to issue a receipt by printing sales data successively on the receipt. At step B10, the CPU 11 stores associated manipulation data as journal data (temporary storage). Then, the process of FIG. 8 is finished and an exit is made from it.

Upon the completion of the registration process (step A5 shown in FIG. 7) of one transaction, the process returns to the above-described step A4 shown in FIG. 7. If a return manipulation is performed in a state that the mode switch MS is at the position of the return (RF) mode (A6: yes), the CPU 11 executes a return process (item return process; step A7) in response to the return manipulation. At step A8, the CPU 11 stores associated manipulation data as journal data (temporary storage). Then, the process returns to step A4.

When the whole day business has finished, for example, and the mode switch MS is switched to the final accounting (Z) mode (A9: yes), at step A10 the CPU 11 executes a final accounting process (step A10) of updating the contents of the transaction-type-by-transaction-type sum file (not shown) etc. At step A11, the CPU 11 stores associated manipulation data as journal data (temporary storage).

At step A12, the CPU 11 determines whether or not a manipulation that commands a manipulation check has been made. If no such manipulation has been made (A12: no), the process returns to the above-described step A4. If such a manipulation has been made (A12: yes), the CPU 11 executes a manipulation check process (step A13; described later). Then, the process returns to step A4. If a power-off manipulation is performed (A14: yes), the CPU 11 executes a prescribed power-off process (step A15) and stops the operation of the operator camera 26 at step A16. Then, the process of FIG. 7 is finished.

Figure 9:
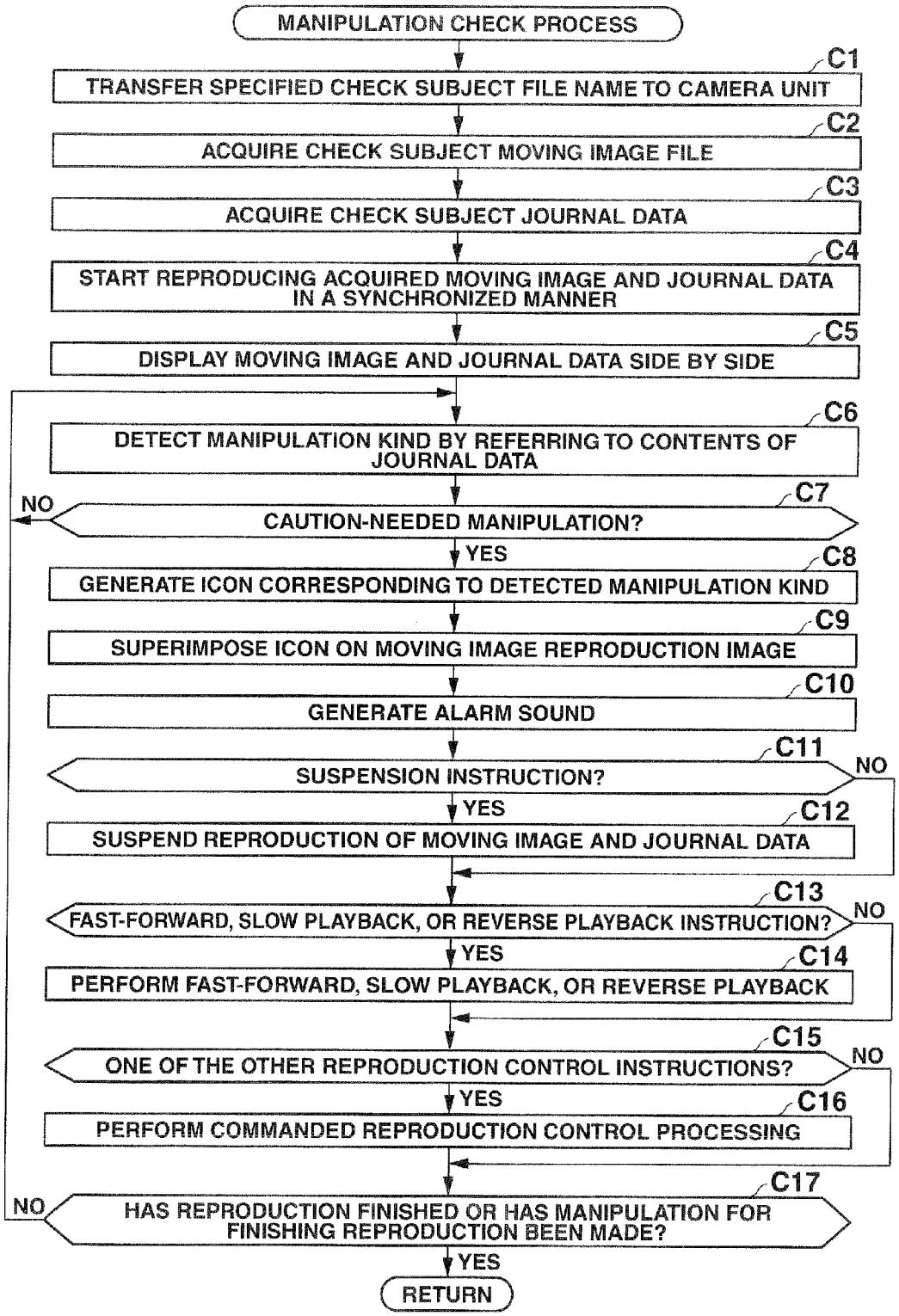
FIG. 9 is a flowchart for detailed description of a manipulation check process (step A13 shown in FIG. 7).

FIG. 9 is a flowchart for detailed description of the manipulation check process (step A13 shown in FIG. 7). The ECR main body unit 1 performs various kinds of processing by cooperating with the camera unit 2, when necessary.

First, if a manipulation of specifying a check subject file name is performed, at step C1 the CPU 11 of the ECR main body unit 1 transfers the specified file name to the camera unit 2. At step C2, the CPU 21 of the camera unit 2 acquires a check subject manipulation moving image from the operator moving image file Y2. At step C3, the CPU 21 acquires check subject journal data from the electronic journal file Y3. As described above, the contents of the operator moving image file Y2 are linked with the contents of the electronic journal file Y3 by the time stamps.

At step C4, the CPU 21 starts reproducing the acquired check subject manipulation moving image and journal data in a synchronized manner. At step C5, the CPU 21 displays the manipulation moving image and the journal data side by side on the operator display unit 16 or the display screen of the external monitor 4. As a result, the moving image file (manipulation moving image) is displayed as a reproduction image OP and the journal data is displayed as a reproduction image JR in the manner shown in FIG. 6. While reproducing the manipulation moving image and the journal data, the CPU 21 detects a manipulation kind by referring to the contents of the journal data (step C6). At step C7, the CPU 21 determines whether or not the detected manipulation is one of the prescribed manipulations that require attention (correction manipulation, return manipulation, and drawer opening manipulation). If the detected manipulation is not any of the prescribed manipulations that require attention (C7: no), the process returns to step C6. Steps C6 and C7 are executed repeatedly until detection of a caution-needed manipulation.

If a caution-needed manipulation (one of the correction manipulation, the return manipulation, and the drawer opening manipulation) is detected (C7: yes), at step C8 the CPU 21 generates an icon corresponding to the kind of the caution-needed manipulation. At step C9, the CPU 21 superimposes the generated icon on the moving image reproduction image OP as alerting data. For example, if the detected caution-needed manipulation is a drawer opening manipulation, an icon IC consisting of an image figure of an open drawer and a character string "Open!" is superimposed as shown in FIG. 6. At step C10, the CPU 21 generates an alarm sound in addition to the superimposition of the icon. The display of the icon and the generation of the alarm sound are continued for a prescribed time (e.g., 1 to 2 seconds).

Then, the CPU 21 determines whether or not a manipulation that commands suspension of the reproduction has been made (step C11), whether a manipulation that commands fast-forward, slow playback, or reverse playback has been made (step C13), whether or not one of the other reproduction control manipulations has been made (step C15), and whether the reproduction has finished or a manipulation for finishing the reproduction has been made (step C17). If suspension of the reproduction is commanded (C11: yes), at step C12 the CPU 21 suspends the operation of reproducing the manipulation moving image and the journal data. If a manipulation for commanding fast-forward, slow playback, or reverse playback has been made (C13: yes), at step C14 the CPU 21 causes a fast-forward, a slow playback, or a reverse playback.

If one of the other reproduction control manipulations such as a manipulation commanding cancellation of suspension, fast-forward, slow playback, or reverse playback has been made (C15: yes), at step C16 the CPU 21 performs reproduction control processing corresponding to the manipulation such as cancellation of suspension, fast-forward, slow playback, or reverse playback. Then, steps C6 to C17 are executed repeatedly until a manipulation for finishing the reproduction is made or the check subject manipulation moving image is reproduced to its end (i.e., until the judgment result of step C17 turns to "yes").

As described above, in the first embodiment, the timing of occurrence of a prescribed caution-needed manipulation is detected by successively referring to the contents of the electronic journal file Y3 which is displayed in link with reproduction of a manipulation moving image in the operator moving image file Y2. And prescribed alerting data is displayed so as to be associated with the manipulation moving image with the detected timing. Therefore, a check for an unjust manipulation can be performed efficiently and reliably by paying attention to manipulations that require attention, that is, manipulations that might relate to injustices. Furthermore, the load of a person who performs checks can be reduced.

The prescribed manipulations that require attention are the correction manipulation for commanding correction of input data, the drawer opening manipulation for commanding opening of the drawer 18A, and the return manipulation for commanding item return processing. That is, the manipulations that might relate to injustices and hence should be checked are not limited to the drawer opening manipulation but can include the correction manipulation and the return manipulation.

An icon corresponding to a manipulation kind that requires attention is displayed so as to be associated with a manipulation moving image. This enables a display that is high in viewability and hence can be recognized easily at a glance, thus increasing the efficiency of check work.

The contents of journal data are displayed successively on the screen so as to be linked (synchronized) with a reproduction operation of reading out and reproducing (displaying) a manipulation moving image. Therefore, the moving image and the journal data can be checked while being correlated with each other, which facilitates finding of an unjust manipulation.

Since an alarm sound is generated at the timing of occurrence of a caution-needed manipulation, attention of a person who performs checks can be aroused by both of display and sound generation.

The operator camera 26 is disposed in the vicinity of the customer display unit 24 and the imaging direction and the angle of view of the operator camera 26 are set so that an operator and his or her manipulation situation, the operator can be shot squarely and a manipulation situation can be shot from obliquely above the manipulation unit 14.

Second Embodiment

A second embodiment of the invention will be hereinafter described with reference to FIGS. 10 and 11.

Whereas the above-described first embodiment is directed to only the ECR, the second embodiment is directed to a sales data processing system in which ECRs are connected to a managing apparatus (server) in a communication-possible manner. In the second embodiment, constituent elements having basically the same ones or corresponding ones in the first embodiment will be given the same reference symbols as the latter and will not be described in detail. Only features characteristic of the second embodiment will mainly be described below.

Figure 10:
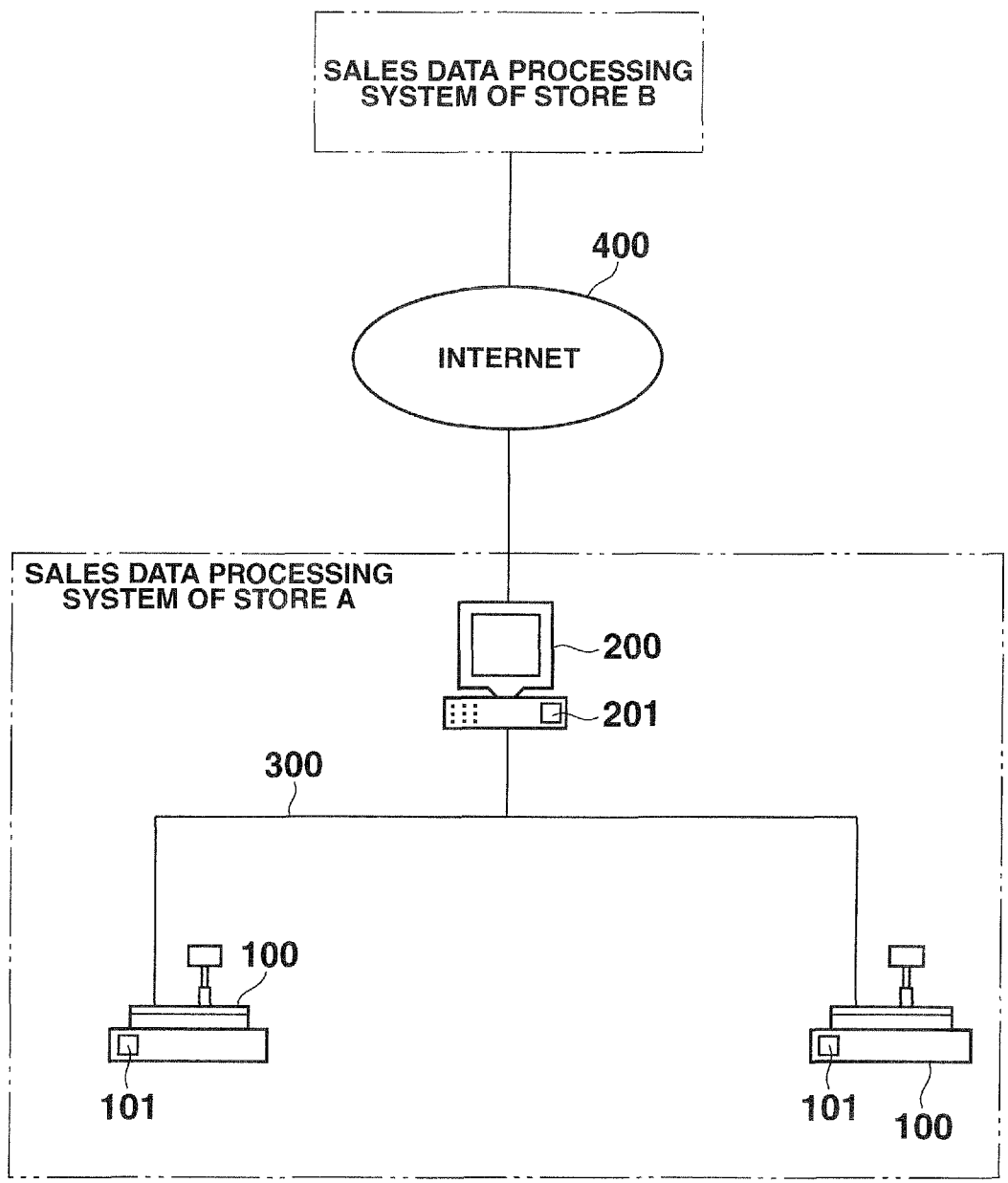
FIG. 10 is a block diagram of a sales data processing system according to a second embodiment which is composed of ECRs 100 (sales data processing apparatus) and a server (managing apparatus) 200 which is connected to each ECR 100 in a communication-possible manner and manages sales data.

FIG. 10 is a block diagram of a sales data processing system according to the second embodiment. This sales data processing system is a LAN system in which plural ECRs 100 installed in a store are connected to a managing apparatus (server) 200 by a LAN (private dedicated line) 300. The sales data processing system of a store A is connected to the sales data processing system of another store (e.g., store B) via the Internet 400 and hence can communicate with the latter. Each ECR 100 is basically the same in configuration as the ECR according to the first embodiment shown in FIG. 1; however, each ECR 100 is additionally equipped with a LAN communication unit 101 for exchanging data with the managing apparatus (server) 200. The managing apparatus (server) 200 is a personal computer (PC), and is equipped with a CPU, a storage unit, a display unit, a manipulation unit, and a LAN communication unit 201 for exchanging data with each ECR 100 (none of them are shown in FIG. 10).

Figure 11:
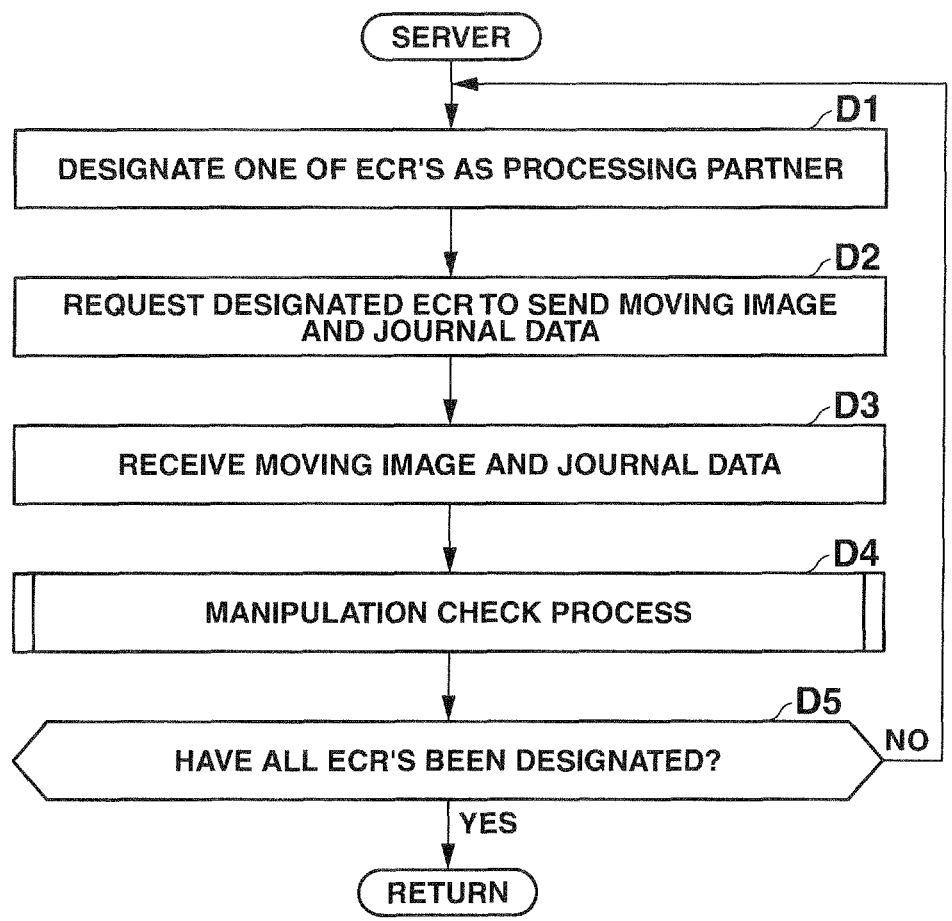
FIG. 11 is a flowchart which outlines a process executed by the server 200.

FIG. 11 is a flowchart which outlines a process executed by the managing apparatus (server) 200.

First, at step D1, the server 200 designates one of the plural LAN-connected ECRs 100 as a processing partner. At step D2, the server 200 requests the designated ECR 100 to send a manipulation moving image and journal data. Each ECR 100 operates basically in the same manner as described above with reference to FIGS. 7 and 8; however, when receiving a data transmission request from the server 200, in response the ECR 100 performs processing of sending a manipulation moving image and journal data to the server 200. That is, in the second embodiment, each ECR 100 does not execute the manipulation check process and leaves it to the server 200. Each ECR may be configured so that it sends a manipulation moving image and journal data not only in the final accounting mode but also in the other modes. The server 200 may request each ECR 100 to send a manipulation moving image and journal data of a specified check subject; alternatively, the server 200 may request each ECR 100 to send a manipulation moving image and journal data of a whole day after the end of business of the whole day.

At step D3, the server 200 receives a manipulation moving image and journal data from the designated ECR 100. At step D4, the server 200 executes a manipulation check process on the basis of the received manipulation moving image and journal data. The server 200 executes a manipulation check process which is basically the same as the manipulation check process shown in FIG. 9. That is, after a start of a reproduction operation of reproducing a manipulation moving image and journal data in a synchronized manner, every time a caution-needed manipulation is detected by referring to the journal data, an icon corresponding to the kind of the detected caution-needed manipulation is superimposed on the manipulation moving image and an alarm sound is generated with its detected timing of occurrence. Upon completion of the manipulation check process (step D4) for the one ECR 100, at step D5 the server 200 determines whether all the ECRs 200 have been designated. If there remains an ECR 200 that has not been specified yet (D5: no), the process returns to step D1 to execute the above-described steps again.

As described above, in the second embodiment, the server 200 requests a designated ECR 100 to send a manipulation moving image and journal data, and executes the manipulation check process on the basis of manipulation moving image and journal data that are transmitted from the ECR 100 in response to the request. Therefore, as in the first embodiment, a check for an unjust manipulation can be performed efficiently and reliably by paying attention to manipulations that require attention, that is, manipulations that might relate to injustices. Furthermore, the load of a person who performs checks can be reduced.

The second embodiment provides the same advantages as the first embodiment also in other aspects. Also in the second embodiment, the prescribed manipulations that require attention are the correction manipulation for commanding correction of input data, the drawer opening manipulation for commanding opening of the drawer 18A, and the return manipulation for commanding item return processing. That is, the manipulations that might relate to injustices and hence should be checked are not limited to the drawer opening manipulation but can include the correction manipulation and the return manipulation. An icon corresponding to a manipulation kind that requires attention is displayed so as to be associated with a manipulation moving image. This enables a display that is high in viewability and hence can be recognized easily at a glance, thus increasing the efficiency of check work. The contents of journal data are displayed successively on the screen so as to be linked (synchronized) with a reproduction operation of reading out and reproducing (displaying) a manipulation moving image. Therefore, the moving image and the journal data can be checked while being correlated with each other, which facilitates finding of an unjust manipulation. Furthermore, since an alarm sound is generated at the timing of occurrence of a caution-needed manipulation, attention of a person who performs checks can be aroused by both of display and sound generation.

The above-described second embodiment is directed to the LAN system in which each ECR 100 is connected to the server 200 by the LAN (private dedicated line) 300. An alternative configuration is possible in which the operator moving image file Y2 and the electronic journal file Y3 are compressed into files of a prescribed form and stored in the SD card 28 which is inserted in the card interface unit 27 and then the SD card 28 is inserted into a PC (managing apparatus). That is, the operator moving image file Y2 and the electronic journal file Y3 may be supplied to the PC (managing apparatus) via a portable external storage medium such as the SD card 28. For example, the operator moving image file Y2 and the electronic journal file Y3 may be supplied together to the PC via the SD card 28 after the end of whole day business. In this case, the PC executes the manipulation check process on the basis of the operator moving image file Y2 and the electronic journal file Y3 stored in the SD card 28.

In each of the above embodiments, an icon corresponding to the kind of a caution-needed manipulation is displayed as prescribed alerting data. Alternatively, a simplified message may be displayed. As mentioned above, an alarm sound that is generated when a caution-needed manipulation is performed may be recorded so as to be correlated with a manipulation moving image being stored in the operator moving image file Y2, and reproduced later at the time of reproduction of the manipulation moving image.

Although in each embodiment a manipulation moving image and journal data are displayed side by side, the journal data may be superimposed on the manipulation moving image.

Each of the devices and units used in each embodiment is not limited to a one that is housed in a single cabinet and may be separated into plural units or subunits that have different functions and are housed in different cabinets. The steps of each flowchart are not limited to such as to be executed in time-series order and plural ones of them may be executed parallel or individually (or independently of each other).

Although the embodiments of the invention have been described above, the invention is not limited to them but encompasses the concepts as defined by the claims and equivalents thereof.

What is claimed is:

1. A sales data processing apparatus which registers and processes sales data on one transaction, the apparatus comprising:
    a storage control module configured to (i) successively image, with an imaging module, manipulation situations of an operator on the one transaction, (ii) store, in a recording storage module, the manipulation situations imaged by the imaging module as a moving image, and (iii) successively store, in a journal storage module, manipulation data of respective manipulations on the one transaction as journal data in link with the moving image;
    a reproducing display module configured to reproduce and display the moving image stored in the recording storage module;
    a determining module configured to determine whether manipulation data of a manipulation kind of a caution-needed manipulation is in the moving image by successively referring to the journal data stored in link with the moving image when a checking command is performed with respect to the moving image; and
    a display control module configured to display alerting data representing the manipulation kind of the caution-needed manipulation so as to be displayed with the moving image showing a manipulation situation at a timing when the manipulation data is stored, in a case where the determining module determines that the manipulation data of the caution-needed manipulation is in the journal data.

2. The sales data processing apparatus according to claim 1, wherein the caution-needed manipulation includes at least one of a correction manipulation for commanding correction of input data, a drawer opening manipulation for commanding opening of a drawer, and a return manipulation for commanding item return processing.

3. The sales data processing apparatus according to claim 1, wherein the display control module displays, as the alerting data, an icon corresponding to the manipulation kind of the caution-needed manipulation visually in synchronism with reproducing and displaying the moving image.

4. The sales data processing apparatus according to claim 1, wherein the display control module displays the journal data stored in link with the moving image in the journal storage module so as to be displayed with the moving image when displaying the moving image.

5. The sales data processing apparatus according to claim 1, further comprising an alarm sound generating module configured to generate a prescribed alarm sound when the determining module determines that the manipulation data of the caution-needed manipulation is in the journal data.

6. The sales data processing apparatus according to claim 1, wherein the imaging module is disposed in a vicinity of a customer display unit, and an imaging direction and an angle of view of the imaging module are set so that the imaging module images the operator and a manipulation situation of the operator.

7. A sales data processing method which registers and processes sales data on one transaction, the method comprising:
    performing storage control including: (i) successively imaging, with an imaging module, manipulation situations of an operator on the one transaction, (ii) storing, in a recording storage module, the manipulation situations imaged by the imaging module as a moving image, and (iii) successively storing, in a journal storage module, manipulation data of respective manipulations on the one transaction as journal data in link with the moving image;
    reproducing and displaying the moving image stored in the recording storage module;
    determining whether manipulation data of a manipulation kind of a caution-needed manipulation is in the moving image by successively referring to the journal data stored in link with the moving image when a checking command is performed with respect to the moving image; and
    performing display control to display alerting data representing the manipulation kind of the caution-needed manipulation so as to be displayed with the moving image showing a manipulation situation at a timing when the manipulation data is stored, in a case where it is determined that the manipulation data of the caution-needed manipulation is in the journal data.

8. The sales data processing method according to claim 7, wherein the caution-needed manipulation includes at least one of a correction manipulation for commanding correction of input data, an accounting manipulation for commanding finishing of one transaction, and a return manipulation for commanding item return processing.

9. The sales data processing method according to claim 7, wherein performing the display control comprises displaying, as the alerting data, an icon corresponding to the manipulation kind of the caution-needed manipulation visually in synchronism with reproducing and displaying the moving image.

10. The sales data processing method according to claim 7, wherein performing the display control comprises displaying the journal data stored in link with the moving image in the journal storage module so as to be displayed with the moving image when displaying the moving image.

11. The sales data processing method according to claim 7, further comprising generating a prescribed alarm sound when it is determined that the manipulation data of the caution-needed manipulation is in the journal data.

12. A non-transitory computer-readable storage medium having stored thereon a program that is executable by a computer to cause the computer to execute functions comprising:
    registering and processing sales data on one transaction;
    successively imaging, with an imaging module, manipulation situations of an operator on the one transaction, storing the manipulation situations imaged by the imaging module into a recording storage module as a moving image, and successively storing, in a journal storage module, manipulation data of respective manipulations on the one transaction as journal data in link with the moving image;

performing and displaying the moving image stored in the recording storage module;

determining whether manipulation data of a manipulation kind of a caution-needed manipulation is in the moving image by successively referring to the journal data stored in link with the moving image when a checking command is performed with respect to the moving image; and displaying alerting data representing the manipulation kind of the caution-needed manipulation so as to be displayed with the moving image showing a manipulation situation at a timing when the manipulation data is stored, in a case where the manipulation data of the caution-needed manipulation is in the journal data.

13. The non-transitory computer-readable storage medium according to claim 12, wherein the caution-needed manipulation includes at least one of a correction manipulation for commanding correction of input data, a drawer opening manipulation for commanding opening of a drawer, and a return manipulation for commanding item return processing.

14. The non-transitory computer-readable storage medium according to claim 12, wherein the program is executable by the computer to cause the computer to execute a further function comprising:

displaying, as the alerting data, an icon corresponding to the manipulation kind of the caution-needed manipulation visually in synchronism with reproducing and displaying the moving image.

15. The non-transitory computer-readable storage medium according to claim 12, wherein the program is executable by the computer to cause the computer to execute a further function comprising:

displaying the journal data stored in link with the moving image in the journal storage module so as to be displayed with the moving image when displaying the moving image.

16. The non-transitory computer-readable storage medium according to claim 12, wherein the program is executable by the computer to cause the computer to execute a further function comprising:

generating a prescribed alarm sound when the manipulation data of the caution-needed manipulation is in the journal data.

17. The non-transitory computer-readable storage medium according to claim 12, wherein the imaging module is disposed in a vicinity of a customer display unit, and an imaging direction and an angle of view of the imaging module are set so that the imaging module images the operator and a manipulation situation of the operator.

* * * * *